United States Patent [19]

Glynn

[11] 3,737,169
[45] June 5, 1973

[54] GASKET MATERIAL AND METHOD OF MAKING SAME
[75] Inventor: David P. Glynn, Framingham, Mass.
[73] Assignee: Federal-Mogul Corporation, Southfield, Mich.
[22] Filed: May 13, 1971
[21] Appl. No.: 143,197

Related U.S. Application Data
[63] Continuation of Ser. No. 868,381, Oct. 22, 1969, abandoned.

[52] U.S. Cl..............277/235 B, 117/43, 161/109, 161/116, 161/126, 161/147, 161/190, 277/DIG. 6
[51] Int. Cl......F16j 15/32, B32b 19/00, B32b 27/40
[58] Field of Search............277/227, 228, 235 B, 277/DIG. 6; 161/109, 116, 146, 147, 126, 190; 117/43, 44, 38

[56] References Cited
UNITED STATES PATENTS

| | | | |
|---|---|---|---|
| 3,477,867 | 11/1969 | Hillier | 117/4 |
| 2,197,916 | 4/1940 | Balfe | 277/235 B |
| 3,167,323 | 1/1965 | Appleton et al. | 277/205 |
| 3,131,081 | 4/1964 | Husum | 117/45 |
| 3,567,234 | 2/1971 | Skrycki | 277/235 B |
| 3,606,360 | 9/1971 | Barker | 277/227 |

*Primary Examiner*—Harold Ansher
*Attorney*—Harness, Dickey and Pierce

[57] ABSTRACT

A gasket material comprising a base material of substantially uniform thickness and deformability cut in a desired configuration and having an elastomeric deformable bead deposited on at least one face surface of the base material in a desired pattern and projecting outwardly of the plane of the base material.

6 Claims, 6 Drawing Figures

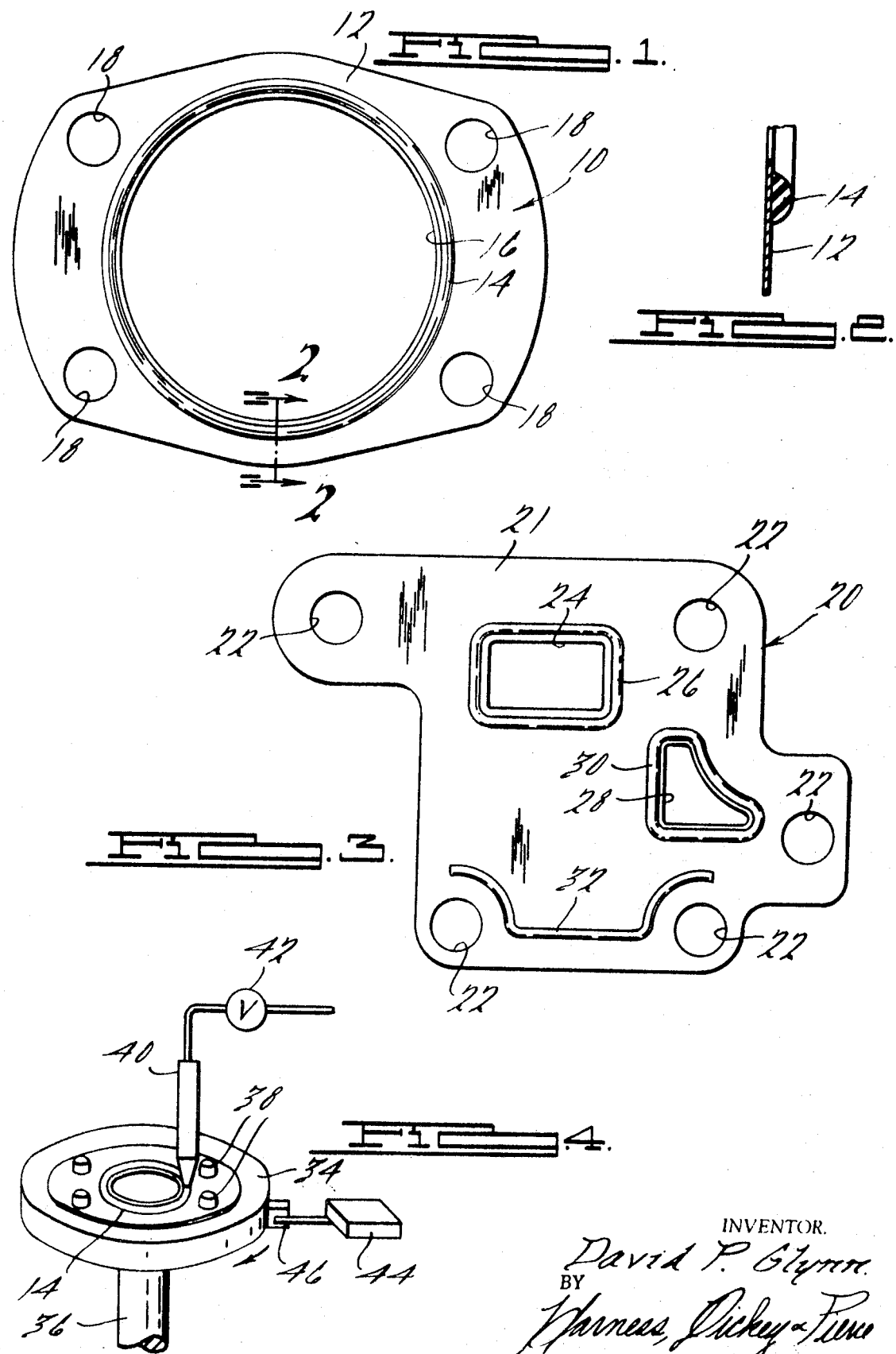

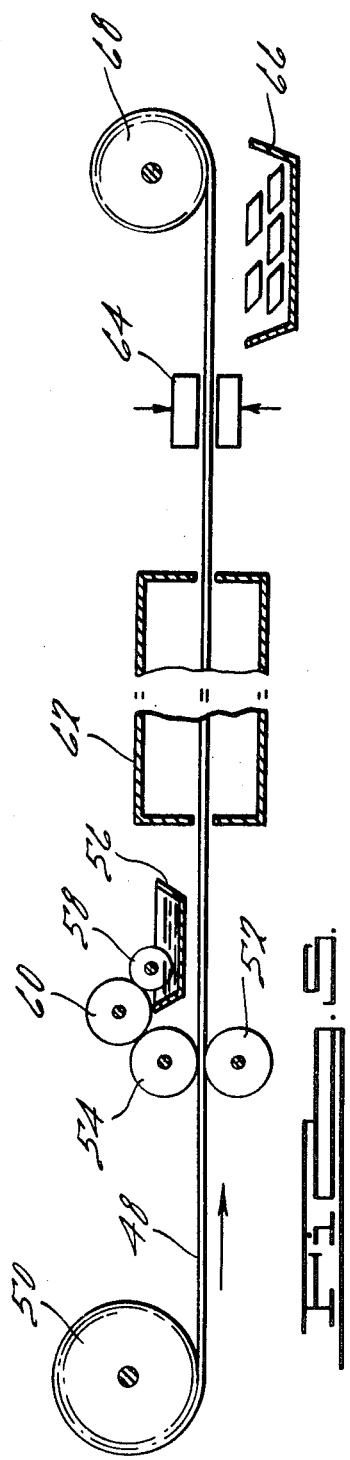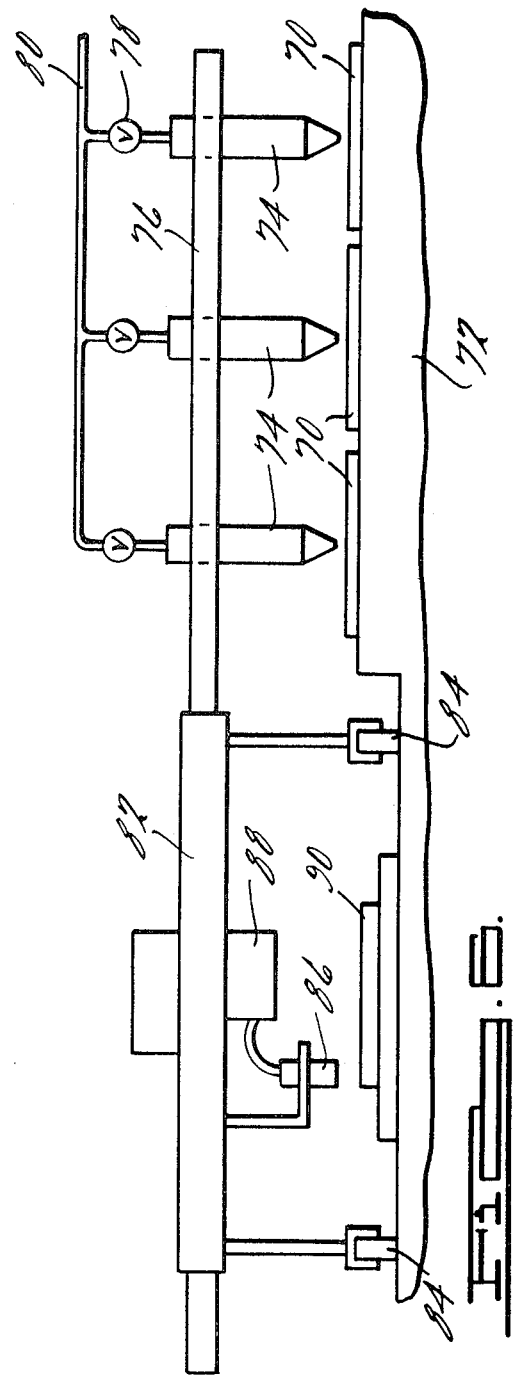

GASKET MATERIAL AND METHOD OF MAKING SAME

This application is a continuation of application Ser. No. 868,381, filed Oct. 22, 1969, now abandoned.

BACKGROUND OF THE INVENTION

The ultimate objective in forming a sealed connection is to have the resultant assembly perform as if no connection were present. While this ultimate objective is never attained in practice, various joint designs and static sealing materials have heretofore been used or proposed for use to provide joints or connections which possess satisfactory performance at reasonable cost consistent with their intended end use. In situations in which a rigid connection providing an almost perfect joint is required, relatively heavy accurately machined flanges are usually provided between which a thin, substantially incompressible gasket material is disposed and is securely clamped by means of numerous heavy fasteners. Joints of this type are relatively expensive. In situations in which the performance requirements of a joint are less stringent, less rigid flanges having less accurately finished surfaces can be employed in combination with a thicker, more compressible gasket material, providing a joint which is less expensive, but also is of lower rigidity and of poorer sealing efficiency. A further problem generally associated with the use of relatively thick compressible gasketing materials is a progressive loss of torque on the flange bolts or fasteners during the life of the joint, contributing to a progressive reduction in the rigidity of the connection, as well as a possibility of eventual leakage.

When such a loss in torque retention cannot be tolerated, relatively expensive joints are required incorporating accurately machined mating surfaces and a thin, relatively non-compressible gasket material or, alternatively, the mating flange surfaces have been provided with grooves for receiving a compressible O-ring which is deformed upon tightening of the flange fasteners forming a suitable seal. The provision of such grooves in the flange surfaces in order to properly locate the O-ring sealing member constitutes a time consuming and costly operation. In order to avoid this costly machining, it has heretofore been proposed to form metallic gaskets incorporating molded rubber O-rings or sealing members in interlocked relationship thereon for accurately positioning the sealing members relative to a joint. While effective, such composite gasketing materials have not received widespread acceptance due to their relatively high cost, particularly in view of the tooling requirements in providing a myriad of different molds to permit manufacture of the various gasket types and sizes required in industry.

The improved gasketing material comprising the present invention overcomes the various problems associated with forming low-cost, substantially rigid sealed connections, while the method comprising the present invention enables the low-cost manufacture of such gaskets in an almost unlimited variety of sizes and configurations.

SUMMARY OF THE INVENTION

The advantages and benefits of the present invention are achieved by a gasket comprising a deformable base material which is of a relatively thin uniform thickness and a deformable elastomeric bead material which is applied to localized areas of at least one face of the base material in a desired pattern. The base material itself is normally provided with one or a plurality of apertures disposed at locations so as to coincide with the bolt holes of the flange to be sealed and additionally, may be provided with one or more central apertures. The elastomeric deformable bead may be applied in a discontinuous or continuous closed circuit pattern around the apertures through the gasket to provide the desired sealing function and is applied so as to project outwardly of the plane of the base material for engagement with the opposing mating flange surface of a joint to be sealed.

In accordance with the method aspects of the present invention, the composite gasket materials of the present invention can be economically fabricated in an almost unlimited variety of shapes and sizes by imprinting a continuous strip of the base material with a desired pattern of the elastomeric bead, whereafter the gaskets are severed from the strip. Alternatively, individual sections of the base material of the desired configuration can be cut from base material and thereafter placed in accurate registry on fixtures, including a nozzle movable relative to the gasket for applying the elastomeric bead in the desired pattern as controlled through a pantograph mechanism, including an appropriate template of the bead pattern to be applied. After the deposition of the elastomeric bead material to the base material, the composite gasket is treated to effect a drying and/or curing of the elastomeric bead composition and an adherence of the bead to the base material.

Additional benefits and advantages of the present invention will become apparent upon a reading of the description of the preferred embodiments taken in conjunction with the accompanying drawings.

BRIEF DESCRIPTION OF THE DRAWINGS

FIG. 1 is a plan view of a typical composite gasket fabricated in accordance with the preferred embodiments of the present invention;

FIG. 2 is a magnified transverse sectional view through a portion of the composite gasket shown in FIG. 1 and taken along the line 2—2 thereof;

FIG. 3 is a plan view of an alternative typical composite gasket incorporating discontinuous and continuous elastomeric beads on one face thereof;

FIG. 4 is a fragmentary partly schematic perspective view of an apparatus for applying a circular elastomeric bead to a gasket of the type shown in FIG. 1;

FIG. 5 is a schematic side elevational view of a process for continuously imprinting a strip of the base material with the desired pattern of the elastomeric bead, whereafter the gaskets are die cut from the strip; and FIG. 6 is a schematic side elevational view of an alternative apparatus employing a pantograph mechanism for applying the elastomeric bead to pre-cut sections of base material of a desired pattern.

DESCRIPTION OF THE PREFERRED EMBODIMENTS

Referring now in detail to the drawing and as may be best seen in FIGS. 1 and 2, a typical composite gasket 10 is shown comprising a base material 12 having an elastomeric bead 14 secured to one face surface thereof and positioned concentrically with respect to a circular aperture 16 through the center of the base material 12. The gasket 10 is provided with four apertures 18 in the corners thereof, through which the shanks of fasteners, such as bolts, are adapted to extend when the gasket is positioned between two mating flanges of a joint. The elastomeric bead 14, in the embodiment shown in FIG. 1, is of a substantially circular configuration and is positioned slightly inwardly of the edge of the central circular aperture 16 through the base sheet. As will be noted in FIG. 2, the elastomeric bead projects outwardly of the plane of the base sheet and typically is provided with a convex cross-sectional contour, such as the substantially semi-circular configuration shown in the drawing.

The base material itself is relatively thin and is of substantially uniform thickness and deformability throughout. The base material not only serves as a carrier for the elastomeric bead and enables accurate positioning of the bead between the flanges of the joint to be sealed, but more importantly, provides a secondary sealing function by transmitting the load applied to the bead, without appreciable dissipation to the opposite side of the base material, thereby providing effective sealing on that flange surface not in direct contact with the elastomeric bead. In order to achieve satisfactory sealing of flanged joints of poor or moderate surface finish and flatness, the height of the elastomeric bead relative to the thickness of the base material should be controlled within a ratio of from about ½:1 up to about 10:1, and preferably within a ratio of from about 1:1 to about 4:1. At height to thickness ratios in excess of about 10:1, it has been found in some instances that a joint of less than optimum rigidity is obtained when beads of relatively low deformability are used due to inadequate compression of the base material in the peripheral areas of the gasket. Ratios in excess of 10:1 can be satisfactorily employed if the bead material is highly deformable but such bead materials are usually less desirable than those of lower deformability under equal load due to their poor sealability. On the other hand, height to thickness ratios of less than about ½:1 have been found to provide inadequate sealing in some situations where the mating flange surfaces are relatively rough and/or warped, providing an inadequate quantity of elastomeric bead material for flow into the surface imperfections in the flange, for effecting a tight seal therebetween. It is for this reason that the height to thickness ratios for composite gaskets in accordance with the present invention are usually controlled from about ½:1 up to about 10:1 and preferably within the range of about 1:1 up to about 4:1.

The elastomeric bead material can be applied in the form of a closed loop or as discontinuous beads of varying configurations consistent with the specific sealing function to be performed by the composite gasket. Exemplary of alternative elastomeric bead configurations are those incorporated in the composite gasket 20 shown in FIG. 3. The gasket 20 includes a base material 21, which is provided with corner bolt holes or apertures 22 in the corners thereof, through which the shanks of the flange bolts are adapted to extend. The base material is further provided with a rectangular port or aperture 24, around which a generally rectangular elastomeric bead 26 extends, as well as a substantially triangular port or aperture 28 having a correspondingly shaped triangular elastomeric bead 30 therearound. A discontinuous generally U-shaped elastomeric bead 32 is provided along the lower edge of the gasket to provide a desired sealing function in the final assembled flanged connection.

It will be appreciated that alternative configurations of the elastomeric bead material can be provided to best adapt the resultant composite gasket to a specific flanged connection so as to provide optimum sealing and rigidity. For example, in critical sealing situations, a plurality of concentric continuous elastomeric beads can be applied around a port or aperture, through the base material, in radially spaced relationship providing further assurance of the integrity of the resultant assembled flanged connection. Ordinarily, however, a single elastomeric bead of an appropriate height to thickness ratio in combination with a base material possessing the requisite deformability is adequate for most sealing functions. It will also be apparent from the composite gaskets 10 and 20 shown in the drawings that the strategic disposition of the elastomeric bead material over localized areas of the base material results in optimum utilization of the elastomeric composition, further reducing the cost of such composite gaskets.

The base material of which the composite gasket is comprised may consist of any one of a variety of relatively dense sheet materials of substantially uniform thickness which are deformable so as to conform with the contour of the mating flange surface. For this purpose, sheet materials ordinarily employed as gaskets have been found eminently satisfactory for receiving and supporting the elastomeric bead material which is chemically compatible with the sheet material. Sheet materials which have been found particularly suitable include fibrous compositions usually containing from about 10 percent up to about 100 percent by weight of a fibrous reinforcing agent including cellulose or other organic fibers either in a treated or untreated condition and asbestos or other inorganic fibers, as well as mixtures of the two. The fibrous reinforcing network can be bonded into an integral sheet by employing a suitable binding agent generally present in amounts up to about 75 percent by weight. Such binding agents include various naturally occurring resinous substances such as proteins, in addition to various synthetic resins and elastomeric materials, such as natural or synthetic rubbers including polysulfide, acrylonitrile-butadiene, polychloroprene, styrene butadiene, etc. Typical of naturally occurring resin or protein binders is glue-glycerine. In addition to the asbestos or other inorganic fibers and cellulose or other organic type of fibers comprising the base sheet reinforcing network, small proportions of metallic fibers may also be included to impart the desired resultant physical and chemical characteristics to the base sheet.

In addition to the aforementioned fibrous-type base materials, foam or cellular-type base materials which are also compressible as well as deformable can also be satisfactorily employed in fabricating the composite gasket. Such cellular base materials generally possess greater compressibility characteristics than the fibrous-type materials, and typically are composed of natural and synthetic plastic foams including, for example, cellular polyethylene, cellular neoprene, cellular nitrile rubber, foamed polypropylene, cellular polyesters and the like. In addition to the foregoing, deformable but relatively non-compressible base materials can also be used including metallic foils of lead, aluminum, steel, etc. and natural and synthetic plastic films including polyvinyl chloride, polyvinylidene chloride, polyesters, polyolefins, polyamide, and the like.

For the purposes of the present invention, the base material may range in thickness from about 0.002 inch up to about 0.250 inch and preferably from about 0.005 to about 0.065 inch. The base material, when of a compressible as well as a deformable material such as the fibrous-type base materials previously described, is preferably selected so as to possess controlled compressibility characteristics ranging from about 2 percent up to about 60 percent, more usually from about 5 percent to about 40 percent, and most commonly from about 10 percent up to about 30 percent. The specific thickness of the gasket and the deformability and compressibility thereof can be varied within the aforementioned ranges, depending upon the specific size of the flanged joint, the smoothness and alignment of the mating flange surfaces, the rigidity of the joint desired and the particular sealing function to be performed. The sealing function of the elastomeric bead provides increased latitude in selecting the appropriate base materials. Base materials within the upper range of thickness and/or compressibility are generally less desirable due to the possible reduced rigidity of the resultant joint, as well as the loss of torque retention in the fastener. On the other hand, relatively thin deformable base materials of low or no compressibility provide for a substantially rigid joint with good torque retention and are generally preferred when the size and nature of the flange connection permits. For many uses, base materials of a thickness of 0.005 to about 0.065 inch, having compressibilities of from about 10 percent to 30 percent with an elastomeric bead height to sheet thickness ratio of about 1:1 up to about 4:1, provide excellent sealing characteristics in many flange applications.

The term "compressibility" as herein employed in connection with the base material is derived in accordance with the test method described in ASTM Method of Test F36–66 employing Procedure A for ASTM Material Type 1 (compressed asbestos and beater asbestos sheet) and Procedure G for ASTM Material Type 3 (cellulose fiber, treated and untreated). Under Procedure A, the base sheet material is preloaded for 15 seconds at 100 psi, whereafter a total load of 5,000 psi is applied for 60 seconds and the percent compressibility measured. Procedure G is similar but employs a preload of 20 psi and a total load of 1,000 psi.

The term "deformation" as herein employed refers to the ability of the base material to conform to mated flange surfaces whether or not accompanied by compression of the material and wherein the material is of sufficient tensile strength to prevent significant extrusion on lateral flow from between the joint flanges.

The elastomeric bead material may be composed of any natural or synthetic elastomeric composition which can be applied in the form of a liquid to one or both face surfaces of the base sheet and thereafter cured to form a resilient deformable bead resistant to the particular materials and/or fluids to be sealed. In addition to the various natural and synthetic rubber compositions, including oil-resistant rubbers, polyurethane elastomeric compositions have been found particularly satisfactory for forming a resilient bead on various base sheet materials. Elastomeric compositions suitable for use in accordance with the practice of the present invention are further characterized as those which form a bond on the surface of the base material during subsequent curing having a strength sufficient to maintain the bead in appropriate position during storage and subsequent handling of the composite gasket during installation in a flanged connection. The resultant dried and/or cured elastomeric material is further characterized as being resilient and deformable in response to being compressed between the two mating flanges, resulting in a flattening out of the bead and a firm sealing embedment of the bead material into the imperfections and indentations present in the adjacent flange surface. The compaction of the elastomeric bead material also effects a corresponding localized compression of the underlying base material, causing the opposed surface thereof to firmly and sealingly engage the opposite flange surface, effecting a tight seal.

The elastomeric bead material is applied to the base material in the form of a relatively viscous liquid to minimize any appreciable flow-out of the bead and any appreciable reduction in its projecting height relative to the plane of the base sheet. As previously indicated, polyurethane rubbers constitute a suitable material for the elastomeric bead in view of their strength, their compounding versatility to a desired flexibility and elasticity, their resistance to solvents and particularly hydrocarbons, resistance to thermal degradation at temperatures of about 350° F. and over, as well as their good aging characteristics. Such urethane rubbers are well known in the art and basically comprise the reaction of polyisocyanates with resins having active hydroxyl groups, such as polyether and polyester resins. The urethane rubber formulations generally include conventional fillers employed in elastomeric compositions, such as carbon blacks and silicas, as well as cross-linking agents and activators, to effect a curing thereof in accordance with the techniques well known in the art.

Two polyurethane elastomeric compositions which are satisfactory for use in forming the elastomeric bead include a compound designated as H-3196, which is a polyurethane prepolymer that incorporates an accelerator and cures in the presence of air, and a compound designated as N-702 which is an oil-resistant polyurethane polymer incorporating a filler, resin and antioxidant, both available from Dewey and Almy Chemical Division of W. R. Grace & Co. Typical properties of these two compounds are as follows:

| | Compound N-702 | Compound H-3196 |
|---|---|---|
| Specific Gravity (Dry Film Weight) | 1.41 | 1.50 |
| Total Solids | 38–40% | 81% |
| Viscosity (Brookfield LVF5X Viscometer at 60 RPM, No. 4 spindle) | 7500–11000 cps. | 8000–11000 cps. |

It will be apparent from the foregoing that the composite gasket comprising the present invention is of relatively low cost, efficient sealing performance, is of versatile use and can be adapted for sealing a variety of flanged connections, obviating the need for expensive machining operations as previously required. Due to the low cost of the composite gasket, it can readily be discarded upon disassembly of the flanged connection and replaced with a new gasket upon reassembly. In addition to the economies achieved as a result of the efficient use of the materials of which the composite gasket is comprised, further economies are effected in the method of manufacturing the gasket and the minimal requirements for expensive tooling. The cutting or severing of the base material from a continuous strip of the gasket material including the formation of appropriate apertures in the individual material sections can ordinarily be effectively accomplished by using inexpensive steel rule dies. In those instances where critcial dimensional tolerances must be met, more expensive male-female steel die sets can be utilized. In accordance with the processes hereinafter described, the application of the elastomeric bead can be made directly to a continuous web, whereafter the base material is cut in appropriate registry from the strip or, alternatively, the continuous web can first be cut and the bead thereafter applied to localized areas of the pre-cut base material.

One method of forming a composite gasket is illustrated in FIG. 4 and is particularly adaptable for making gaskets, such as the gasket 10 shown in FIG. 1, wherein the elastomeric bead is of a circular configuration. As shown in FIG. 4, the apparatus comprises a turntable consisting of a platform 34 affixed to an upright rotatable shaft 36, which is driven by means well known in the art for effecting a rotation of the platform. The upper surface of the platform is provided with a plurality of alignment pins 38, which are adapted to extend through apertures in the base material, such as the apertures 18 of the composite gasket 10 shown in FIG. 1, for positioning the base material in appropriate registry. A nozzle 40 is adjustably mounted above the platform and is connected by means of a suitable solenoid valve 42 to a pressurized supply of the elastomeric composition.

In operation, after placement of the base material on the platform 34, the platform is rotated and the solenoid valve is actuated, effecting the deposition of an elastomeric bead in a circular pattern on the upper face of the base material similar to the elastomeric bead 14, as shown in the composite gasket of FIG. 1. The opening and closing of the solenoid valve 42 may suitably be controlled by a limit switch 44 adapted to be actuated by a cam 46 projecting from the platform 34 so as to stop the supply of elastomeric composition at the completion of one or more revolutions of the turntable. At the completion of the deposition of the circular bead 14, the nozzle is retracted, enabling removal or ejection of the composite gasket, which thereafter is subjected to a process for effecting a curing, drying and/or hardening of the elastomeric bead material. The loading, unloading and operation of the apparatus illustrated in FIG. 4 can conveniently be automated.

An alternative process for fabricating composite gasket materials in a continuous manner is illustrated in FIG. 5. As shown, a continuous web 48 of the base sheet material is unwound from a supply reel 50 and extends horizontally therefrom between a backup roll 52 and an imprinting roll 54. The imprinting roll is provided with a suitable surface pattern for printing the elastomeric bead composition on the upper surface of the web 48 as it passes therebetween. The elastomeric composition is supplied to the imprinting roll from a supply pan 56 in which a pickup roll 58 is rotatably suspended and is disposed with the periphery thereof in contact with a transfer roll 60, which in turn is disposed with its periphery in contact with the raised projections on the imprinting roll.

The imprinted web, upon exiting from the rolls 52, 54, thereafter passes through a curing oven 62, in which the elastomeric bead composition is heated to an elevated temperature for a period of time sufficient to effect a substantially complete curing or drying thereof. Upon emergence from the curing oven, the continuous web passes between a cutting die assembly 64, by which the continuous web is severed, forming individual composite gaskets of the desired shape with the elastomeric bead composition disposed in appropriate registry on one face thereof. The resultant cut gaskets are discharged into a hopper 66 and the residual continuous web, if desired, can be conveniently rolled up on a takeup reel 68. The technique as shown in FIG. 5 is adapted to high speed manufacture of gaskets in which the elastomeric bead composition can be present in any one of a variety of simple and/or intricate patterns.

An alternative apparatus for depositing the elastomeric bead composition in a desired pattern on a pre-cut base material is shown in FIG. 6 employing a pantograph-type mechanism. As shown, pre-cut sections 70 are positioned in appropriate registry on a platform 72, above which a corresponding number of nozzles 74 are adjustably supported on a beam 76. Each nozzle is connected to a suitable solenoid actuated valve 78, which in turn is connected to a supply line 80 for supplying the pressurized elastomeric composition to the nozzles.

The beam 76 is mounted on a carriage 82 of a pantograph mechanism including two rails 84 providing transverse movement of the carriage. The carriage incorporates a suitable sensing device 86, such as a photoelectric eye mounted on the beam, which is connected to a control system 88 for controlling the operation of motors to effect transverse movement of the carriage along the rails 84 and reciprocating movement of the beam 76 relative to the carriage. The sensing device 86 is positioned above a template 90 provided with an outline of the pattern of the elastomeric bead to be applied. In accordance with this arrangement, the travel of the carriage and beam 76 along the line or edge of the template causes a corresponding movement of each of the nozzles 74, effecting the simultaneous deposition of an elastomeric bead on a plurality of base sheets 70. As in the apparatus shown in FIG. 4, the discharge of the elastomeric bead composition from the nozzle 74 is automatically stopped by the actuation of the solenoid valve 78 after the sensing device has made at least one complete traverse around the pattern as defined by the template.

It will be appreciated that while the description of the preferred embodiments as hereinabove provided is well calculated to achieve the benefits and advantages of the present invention, the invention is susceptible to modification, variation and change without departing from the spirit thereof.

What is claimed is:

1. A gasket material comprising a base material having an elastomeric bead bonded to localized areas thereof and projecting outwardly of the plane of said base material, said base material being of substantially uniform thickness and composed of a fibrous composition containing from about 10 percent up to about 100 percent by weight of a fibrous reinforcing agent, said base material further characterized as having a compressibility of from about 2 percent to about 60 percent and adapted to transmit a compressive load applied to said bead to the opposite face of said base material over an area approximately equal to the area of said bead, said bead composed of a deformable elastomeric material and adapted to be deformed when disposed in sealing engagement between the flanges of a connection.

2. The gasket material as defined in claim 1, wherein the projecting surface of said bead is provided with an arcuate cross sectional contour.

3. The gasket material as defined in claim 1, wherein the projecting height of said bead relative to the thickness of said base material is within a ratio of from about ½:1 to about 10:1.

4. The gasket material as defined in claim 1, wherein said base material is formed with an aperture therethrough and said bead is continuous and is disposed adjacent to the edge of said aperture.

5. The gasket material as defined in claim 1, wherein said bead is composed of an oil-resistant elastomeric material.

6. The gasket material as defined in claim 1, wherein said bead is comprised of a polyurethane elastomer.

* * * * *